Feb. 19, 1957  G. J. HIBBARD  2,781,922
AUTOMOBILE STORAGE ELEVATOR
Filed May 25, 1953  4 Sheets-Sheet 1
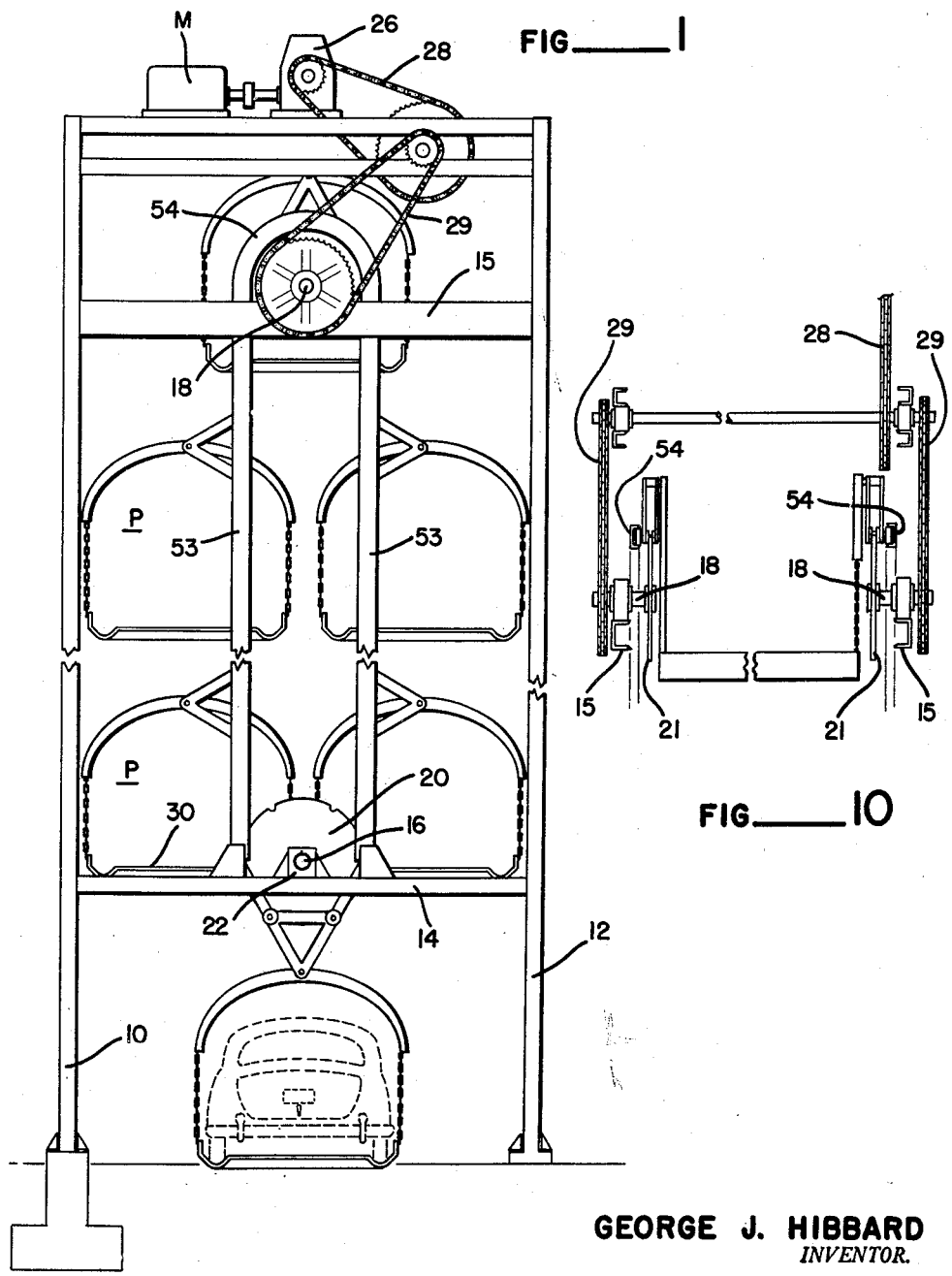
GEORGE J. HIBBARD
INVENTOR.
BY Smith & Tuck Feb. 19, 1957 G. J. HIBBARD 2,781,922
AUTOMOBILE STORAGE ELEVATOR
Filed May 25, 1953 4 Sheets-Sheet 2
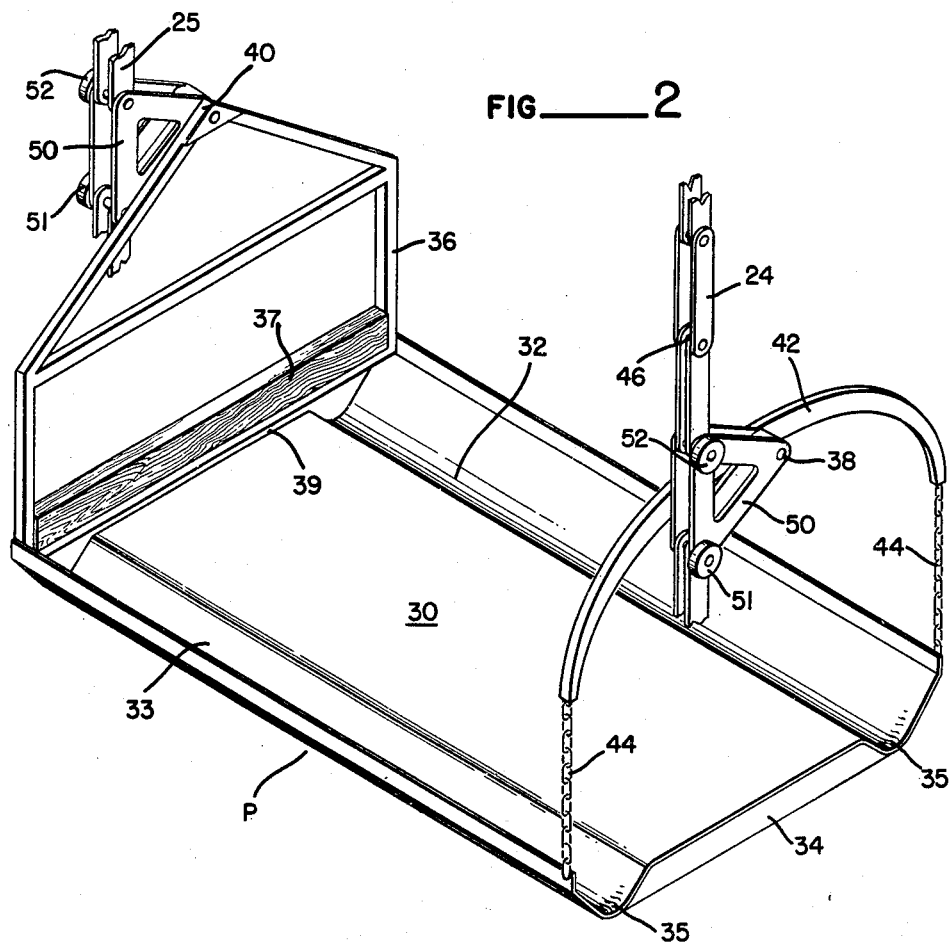
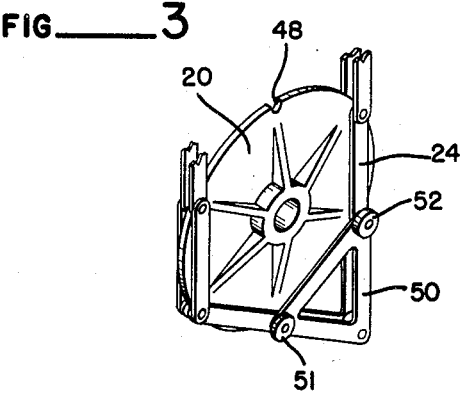
GEORGE J. HIBBARD
*INVENTOR.*
BY Smith & Tuck

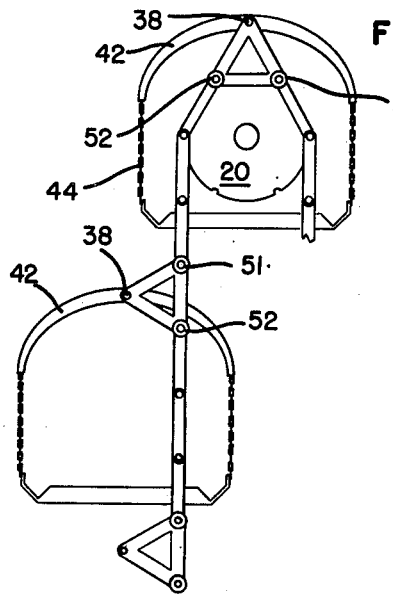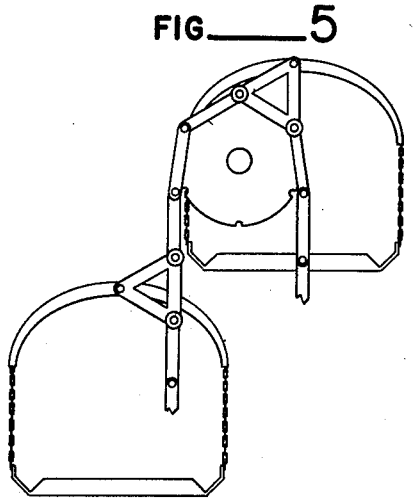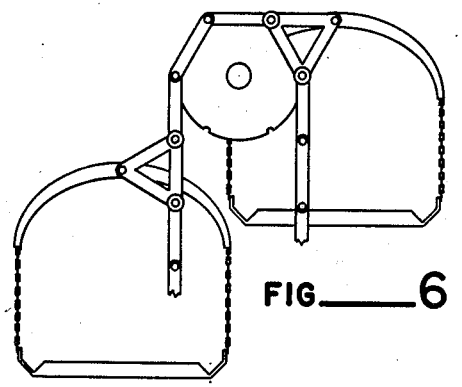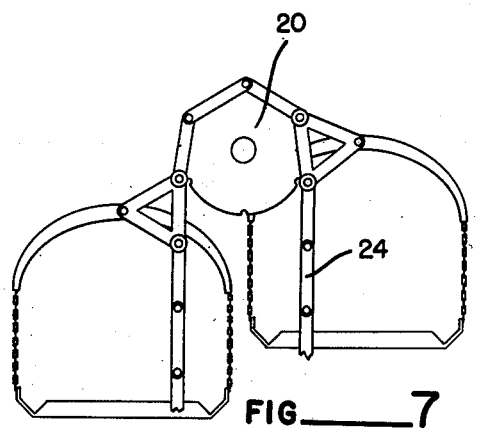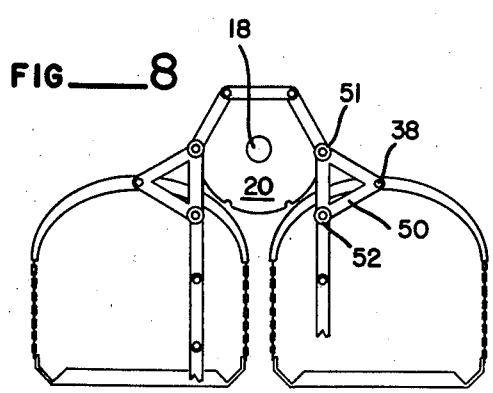

Feb. 19, 1957 G. J. HIBBARD 2,781,922
AUTOMOBILE STORAGE ELEVATOR
Filed May 25, 1953 4 Sheets-Sheet 4
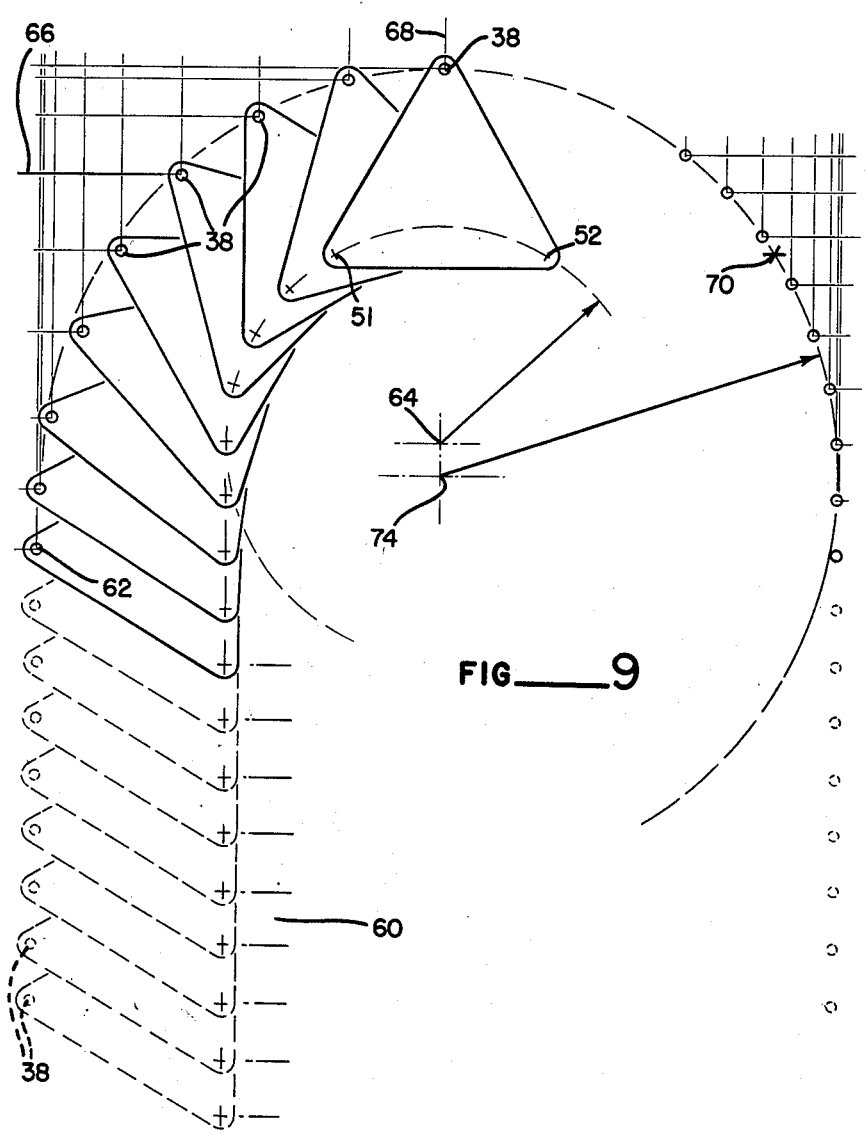
FIG___9
GEORGE J. HIBBARD
*INVENTOR.*
BY
*Smith & Tuck*

United States Patent Office 2,781,922
Patented Feb. 19, 1957

2,781,922

AUTOMOBILE STORAGE ELEVATOR

George J. Hibbard, Seattle, Wash.

Application May 25, 1953, Serial No. 357,050

3 Claims. (Cl. 214—16.1)

This present invention relates to the general art of automobile storage units, and more particularly, to that type of storage arrangement in which the various cars are placed sequentially on pivoted platforms and carried upwardly on two endless chains. The pivoted or free-swinging storage compartments are hung from pivot points offset outwardly from the main elevator chains in order to take advantage of certain very desirable characteristics of this arrangement.

Throughout many highly congested areas in this country there is a very serious problem of trying to provide means for parking the unusual number of automobiles encountered in these overcrowded areas. In some communities the problem is partly met by moving shopping centers and the like to outlying districts. This, however, does not solve the problem for the property owners and those persons who must be employed within the boundaries of the congested districts. Many attempts have been made to solve this problem and considerable development has been made in the staggered or so-called Z ramp garages whereby with reduced ceiling heights a reasonable number of automobiles can be stored on a given ground area.

The most apparent solution however of this general problem is to stack the cars vertically on some elevator arrangement. In some cases the cars are elevated and then shunted on to storage floors. This greatly increases the handling problem because to be effective a storage arrangement must make it possible to handle a large number of cars expeditiously when they are left with the storage facility during peak hours, but more important for the satisfaction of the customer, is that he be able to get his car quickly, and there again there are peaks, usually about quitting time for instance, when a large number of people want their cars at substantially the same time. It is therefore believed that the teachings of this present invention make the most practical solution of this perplexing problem in that the cars are always left on the elevator means and thus are easily recovered when the owners desire them. Further, no building arrangement is required, other than mere shelter from the elements. An ideal arrangement would be to provide a plurality of these elevator units side-by-side so that each elevator could in effect operate by itself, and thus it would be possible to deliver one car from each of the various elevators simultaneously. This is believed to go a long way in meeting the need for this type of equipment.

The principal object of this present invention is to provide means for parking automobiles, disposed one above the other, so that the maximum number of cars may be stored in an enclosing building of a given dimension.

A further object of this present invention is to arrange for the vertical disposition of automobiles wherein the automobiles do not leave the storage conveyor or elevator and thus are readily available to the owner with a minimum loss of time.

A further object of this invention is to provide a vertical storage arrangement which may be built in adjacent units giving storage space for a maximum number of cars in given cubical contents, and yet having each of the conveyor units a separate unit so that cars from any of the various elevators may be taken in or delivered simultaneously.

A further object is to provide a conveyor plan which keeps the size of the major units to a minimum and which by its design arrangement permits storing the vertically disposed cars very closely together to conserve overall space.

A further object of this invention is to provide an offset bracket for each of the trunnions of the car-supporting platforms, and arranging the offset bracket members so as to give increased vertical and lateral movement at the top and bottom of the conveyor in order that there will be no interference between the various platforms as they pass around either the upper or lower sprockets.

A further object of this invention is to provide means whereby an automobile cannot be dislodged from the car-carrying platform even though it is subjected to such unusual conditions as an earthquake or the like.

Further objects, advantages and capabilities will be apparent from the description and disclosure in the drawings, or may be comprehended or are inherent in the device.

In the drawings:

Figure 1 is a typical, vertical, cross-sectional view through an automobile storage unit made after the teachings of this present invention;

Figure 2 is a perspective view showing the details of structure involved in the car storage platforms;

Figure 3 is a fragmentary perspective view illustrating the structural arrangement of the conveyor chain and the positioning and drive sprocket used therewith;

Figures 4, 5, 6, 7 and 8 show sequential movement of the car-carrying platforms as they pass around the upper sprockets;

Figure 9 is a diagrammatic view illustrating the accelerated upward and lateral movement of the car-supporting trunnions as they pass over the upper sprocket; and Figure 10 is a fragmentary elevational view of the upper assembly.

Referring more particularly to the disclosure in the drawings, the numerals 10 and 12 designate vertically disposed supporting or frame members of which sufficient are used to provide an adequate support for the dead load of the equipment together with the live loading of a full complement of cars in storage. Transversely disposed are the horizontal lower frame members 14 and the upper frame members 15. Frame members 14 and 15 are preferably formed of spaced apart structural steel members so that each of the stub shafts 16 and 18 can be supported as a unit, it being understood that in order to provide clearance for the car-supporting platform, the stub-shafts, which in turn support sprockets 20 and 21, do not extend through to connect the two sprockets together. The lower stub-shafts 16 are preferably mounted in vertically adjustable bearings 22 so that proper tension may be placed upon the elevator or conveyor chains 24. Chains 24 are driven by means of the electric motor M through a reduction gearing 26 and then the chain drives 28 and 29. These chains are provided with suitable sprockets to give additional speed reduction as will be noted in Figure 1. It is also to be noted that the chain drives 29 are in duplicate, one on each stub shaft 18, so that the two spaced apart drive sprockets 21 may be driven at the same speed even through they are of necessity not interconnected.

The preferred form of car-supporting platform or bucket is probably best illustrated in Figure 2. Here the preferred form of construction is shown in which a sheet of steel or other suitable material as 30 is employed to form the floor of the platform. Each longitudinal margin of plate 30 is formed with a wheel-receiving channel 32 and 33. These channels are provided preferably with steeply sloping sides and a bottom portion so as to automatically center an automobile wheel in the channels even though it may have been driven on to the platform slightly out of alignment. The entrance end has a turned-up portion 34 and the channels themselves have a turned-up portion somewhat reduced in height at 35. Chains 24, together with guides 53, 54, serve to lock automobiles in place as to events such as an earthquake which might dislodge the same from normal restraining means.

The opposite end of the platform is provided with a rigid framework 36 formed of a plurality of pieces of structural steel preferably to the end that a rigid structure is designed. A retaining bumper 37 is provided together with an underlying floor wall 39, which together form a stop for the wheels of a car. Channels 32 and 33 are preferably closed on this end of the platform so that a car stored on the platform cannot through leakage cause disfigurement of a car below it. It has been found that after a period of running the average car tends to leak oil, grease, or water, and sometimes such items as mud, snow or ice will become loosened from the under body of the car, and unless there is some sealed-off baffle between that car and the one beneath it, damage could easily result. The car platform, generally designated by the reference character P, is provided with two aligned pivots as 38 and 40. These pivots are well above the center of gravity of the platform or of the platform with a car on it. Consequently the platform normally will hang straight down below the pivot at all times.

Supporting the entrance end of platform 30 is a structural member 42 preferably of curved form as illustrated in Figure 2 and connections are made from this member to the side margins of platform 30 by means of cables or chains 44. The conveyor or elevator cables 24 and 25 are formed after the plan of the extended side bar roller chain. This provides a chain of great strength considering its weight, in that it can be formed of steel of high tensile strength, and at the joints rollers are provided, as 46, which are adapted to engage semi-circular openings 48 in the sprockets 20 and 21. This, in the case of the upper sprocket 21, provides for the positive drive. Secured to adjacent pivot points in chains 24 and 25 are a plurality of pivotal supporting brackets 50. These brackets are preferably formed of spaced apart members after the showing of Figure 2 and an equilateral triangular form has proved to be very satisfactory. On the outwardly disposed end of the pivot pins, securing brackets 50 to the chains, are provided roller guide members 51 and 52. These guide members are disposed to travel within the vertically disposed channel members 53 and also in the curved upper channel members 54. Members 51 and 52 are preferably disposed upon antifriction bearings as considerable strain is placed upon them, but by so accepting the strain at this point and transferring it to channels 53 and 54, the twisting moment of the weight of the various platforms P is taken off of chains 24 and 25. Otherwise there would be a great tendency to foreshorten the chains and generally place undue strain upon the elevator mechanism.

In making use of this invention on a commercial basis it is intended that a plurality of units as shown in Figure 1 be employed preferably in a side-by-side arrangement, and the height should normally be such that a substantial number of cars can be disposed one above the other. The height to which the structure can be built should be decided by such considerations as the height of the building required and the comparison of that height with surrounding buildings. A further consideration is the fact that the greater number of cars in a single unit will require correspondingly greater periods for the delivery of a wanted car. There is a further consideration in that the prime purpose of equipment of this order is to provide for a relatively large capacity storage on a limited and presumably high-priced ground area.

With a plant of this order in condition to receive cars, a car to be stored is driven on to the platform 30 which is at an access level, after the showing of Figure 1. It will be noted how the channels 32 and 33 definitely center the cars in the platforms longitudinally, and the forward frame 36 and the rear upturned portion as 35, insure that once the car is driven into place it is secure there. With the car in place, preferably with the brakes struck, the attendant energizes the electric motor M and the elevator is driven sufficiently so that a new vacant platform P is brought down into the loading position. Where considerable height is employed in the structure, it is desirable that alternate platforms be employed in order that the elevator be kept in a balanced arrangement with the weight substantially equally disposed on each side of the vertical axis of the elevator.

When the loaded platform has been started upwardly and a new platform is positioned for loading it is desirable that the elevator brakes be set on the stub shafts controlling the various sprockets 20 and 18. Brakes of this order are well known in hoisting equipment and are normally electrically operated and so keyed into the electrical system that when the current is thrown on to the motor, the brakes are released timely, and when the motor power is shut off, the brakes then automatically are mechanically set. This is a matter of common safety that has been developed in the past, in which the electrical forces merely release the brakes, which normally are provided with springs or the like, to set the brakes should current fail.

Figures 4 through 8 illustrate the sequence showing the movement of the car carrying platforms P as they pass around the upper sheaves 21. I wish to point out that it is desirable to have the minimum vertical spacing between platforms P because the closer together the cars can be stored it follows that the greater number of cars can be stored in a given cubical capacity. The use of the relatively small sheaves 21 means that these members can be kept within reasonable proportions, and, in order to get the various cars around sheaves 21, the offset triangular bracket arrangement 50 is employed. An analysis of the movement of bracket 50 as it passes around sheaves 21 is illustrated in Figure 9. Here it will be noted that the various spaces 60 correspond to the pitch of the chain. Then as the pivot 38 reaches point 62, which is actually considerably below the center 64 of sheaves 21, there begins to be a lateral movement and an increased vertical movement. The increasing vertical acceleration continues up to a height as 66 where it begins to decelerate and it will be noted that the transverse acceleration increases to the midpoint at 68 and then goes into a slow deceleration but is still moving laterally at a rate exceeding the normal chain travel until a point at about 70 is reached. These two accelerated rates in both the vertical and transverse are very desirable in this operation. Ordinarily there is a marked tendency for the up-coming car travelling at a uniform velocity to overtake the car immediately above it, due to the fact that it begins to slow down normally as it makes the upper turns. In this particular instance, as illustrated in Figure 9, this present arrangement prevents any collision between the various car platforms and this factor is in turn reflected in the ability to have the platforms spaced much more closely together than normally and therefore obtain a greater storage capacity in a given sized unit.

To understand the functioning of this accelerated movement around the upper turn, it is best to resort to a diagram such as illustrated in Figure 9. One factor entering into the consideration is that while sprockets 20 and 21 are discs having notches cut in them, they are in effect providing merely support for the semi-circular notches 58 and therefore, as illustrated, these notches could be placed on the corners of the hexagon. In the diagram when passing the triangles along a vertical path the apex as indicated at 38 remains a fixed distance from the vertical center line. Also while points 51 and 52 are in contact with sprockets 20 and 21 the apex 38 remains a fixed distance from and scribes an arc around center 64. However, these distances from apex 38 to the vertical center line and center 64 respectively are not the same due to the spacing between contact points 51 and 52. I have attempted to illustrate this in Figure 9 wherein the triangles suggested by the dashed lines have the contact points 51 and 52 traveling in a vertical path while in the solid line triangles, the contact point 52 is traveling an arcuate path around center 64. Only in the five uppermost triangles as shown, is the contact point 51 scribing an arc. During the intermediate period when point 51 is traveling in a straight line and point 52 is traveling in an arcuate path the distance from apex 38 to the center, center line changes. Also, it will be noted that during this period the advance or spacing between points 38 lack uniformity. The center 74 shows the center which would have to be used if this changing angularity were not utilized thus consuming extra space, the saving of which is a prime object of this invention.

One of the major features of this automobile storage elevator is the providing of the maximum storage for the amount of space occupied, both in terms of vertical measurements and in terms of square footage on the ground. Reducing height is important for economy of construction and the reducing of horizontal space requirements is a necessity in congested areas as well as being otherwise economical. By the use of the brackets above described not only are unduly large and expensive sprocket wheels avoided but also cubical requirements and ground square footage requirements relative the number of cars stored are reduced beyond other methods of construction. This is because prior arrangements wasted space horizontally and vertically principally in the upper and lower turns of the paths of travel of the car-supporting platforms and the present elevator reduces the requirements to a bare minimum with the bracketed construction, as shown in Figures 4 to 8.

This improvement is expressed in various ways in certain of the claims and includes certain limitations requiring explanation. When it is said that the "outer ends of said brackets" are "spaced apart a distance slightly greater than the width of the conventional automobile" this means that pivots 38 in ascending and descending runs are spaced apart only the width of the automobile (adjacent halves of two cars) plus that distance required for clearance of the platforms taking into consideration the possibility of some swinging of the platforms under unusual conditions. The conventional automobile at present averages approximately eighty inches in width and the needed clearance will vary between eight inches and twelve inches.

It will be noted from Figures 4 to 8 that the question of clearance between adjacent platforms is related to the distance between adjacent brackets. In relation to the expression in the claims that the brackets are "spaced apart on centers on said chains a distance of not greater than two and one quarter times the height of the conventional sedan," the sedan height at present averages approximately sixty-four inches. If the clearance is reduced, the brackets should be spaced farther apart and vice versa. The bracketed construction, as distinguished from a structure in which merely larger sprocket wheels are employed, is important in this connection, as demonstrated by Figure 9, permitting less clearance and minimum spacing of adjacent car platforms. Therefore, when it is said that the brackets extend "outwardly a substantial distance" from the chains it is meant that the brackets should have substantial length in comparison with the size of the sprockets as demonstrated in the drawings in which the radius of the sprockets and the length of the brackets are approximately equal. The claims also set a minimum number of car-supporting platforms at six. This is somewhat arbitrary but as a practical matter an entirely realistic minimum; because the structure would not accommodate enough cars on a lot in a congested area unless it has this height and because the cost of adding additional platforms, having the supporting structure to construct, is comparatively so small. It is believed that a ten car elevator is the most practical size.

It is believed that it will be clearly apparent from the above description and the disclosure in the drawings that the invention comprehends a novel construction of an automobile storage elevator.

Having thus described the invention, I claim:

1. An automobile storage elevator, comprising: a supporting structure rising from a supporting surface rotatably supporting four sprocket wheels mounted in spaced superimposed pairs with upper and lower wheels axially aligned in the two pairs, an endless chain encircling each pair of sprockets, a series of integral, rigid triangular brackets mounted on each chain and each forming a link of the chain and extending outwardly therefrom substantially in the plane of the supporting chain with the brackets on the two chains aligned horizontally in pairs, a car supporting platform hung depending from each pair of brackets, each platform having an upper frame pivotally connected at the ends to the outer ends of the associated pair of brackets and having a substantially flat lower floor spaced below and supported by the upper frame adapted to support an automobile with its center of gravity substantially below the associated brackets and with the center line of the automobile parallel to the axes of said sprocket wheels, upward and downward runs of the platforms having small clearance therebetween to accommodate slight swinging of the platforms, said floor being solid and being lipped on all sides to protect cars below from drippings from cars above, said floor having at its sides wheel-receiving channels and having at a first end means blocking said channels preventing passing of the wheels of an automobile and having at a second end raised means normally blocking said channels to prevent the wheels of an automobile from rolling thereof and permitting the passage of the wheels when the automobile is under power, said upper frame having rigid means securing the same to said floor at said first end and said upper frame at said second end comprising a bowed member having depending chains at its ends secured to the sides of said floor whereby the space between the bowed member and the floor permits access of an automobile to the platform.

2. Car supporting means for an automobile storage elevator, comprising: an elongated rectangular substantially flat solid floor lipped on all sides and ends to retain drippings from an automobile positioned on the floor, said floor having at its sides wheel-receiving channels and having at a first end means blocking said channels preventing passing of the wheels of an automobile and having at its second end raised means normally blocking said channels to prevent the wheels of an automobile from rolling thereoff and permitting the passage of the wheels thereover when the automobile is under power, a rigid frame rising from said floor at said first end and having a pivot pin at its top centered between said channels and substantially above the center of gravity of an automobile positioned on said floor, a frame member positioned above said second end of said floor a distance permitting passage of an automobile therebetween and flexible tension members depending from the ends of said bowed member and secured to the sides of said floor at said second end, said frame member having a pivot pin axially aligned with the pivot pin at said first end.

3. Supporting means for a single automobile in an automobile storage elevator, comprising: an elongated, rectangular, substantially flat solid floor lipped on all sides and ends to retain drippings from an automobile positioned on the floor, said floor having at its sides wheel-receiving channels with steeply sloping sides so as to center the wheels of such automobiles, said channels having at a first end abutments blocking said channels preventing passing of the wheels of an automobile and having at their second end raised portions of the bottom normally blocking the channels to prevent the automobile wheels from rolling thereoff and permitting the passage of the wheels thereover when the automobile is under power, a rigid frame rising from said floor at said first end including a pair of posts at the corners, and a broad triangular tying member connecting the top of the posts and having pivot means at the apex of the triangle centered between said channels and substantially above the center of gravity of an automobile positioned on said floor, a bowed frame member positioned above said second end of said floor a distance permitting passage of an automobile therebetween and chains depending from the ends of said bowed member and secured to the corresponding corners of said floor, said bowed frame member having in its center pivot means generally aligned with the pivot means at the first end.

References Cited in the file of this patent

UNITED STATES PATENTS

| | | |
|---|---|---|
| 851,021 | Murray | Apr. 23, 1907 |
| 1,724,196 | Harrison | Aug. 13, 1929 |
| 1,872,594 | James | Aug. 16, 1932 |
| 1,873,391 | Haish et al. | Aug. 23, 1932 |
| 1,940,867 | James et al. | Dec. 26, 1933 |
| 2,627,942 | Nash et al. | Feb. 10, 1953 |

FOREIGN PATENTS

| | | |
|---|---|---|
| 353,900 | Great Britain | July 27, 1931 |
| 595,435 | Great Britain | Dec. 4, 1947 |